(12) United States Patent
Davies

(10) Patent No.: US 10,591,023 B2
(45) Date of Patent: Mar. 17, 2020

(54) ROTARY GEARED ACTUATOR

(71) Applicant: Goodrich Actuation Systems Limited, Solihull, West Midlands (GB)

(72) Inventor: Stephen Davies, Shrewsbury (GB)

(73) Assignee: GOODRICH ACTUATION SYSTEMS LIMITED, Solihull, West Midlands (GB)

(*) Notice: Subject to any disclaimer, the term of this patent is extended or adjusted under 35 U.S.C. 154(b) by 80 days.

(21) Appl. No.: 15/950,506

(22) Filed: Apr. 11, 2018

(65) Prior Publication Data

US 2018/0306273 A1  Oct. 25, 2018

(30) Foreign Application Priority Data

Apr. 20, 2017  (EP) .................................... 17275055

(51) Int. Cl.
*F16H 1/28* (2006.01)
*B64C 13/34* (2006.01)
*F16H 1/48* (2006.01)
*F16H 57/02* (2012.01)
*F16H 57/08* (2006.01)
*B64C 9/24* (2006.01)
(Continued)

(52) U.S. Cl.
CPC .............. *F16H 1/28* (2013.01); *B64C 13/34* (2013.01); *F16H 1/48* (2013.01); *F16H 57/02004* (2013.01); *F16H 57/082* (2013.01); *B64C 3/38* (2013.01); *B64C 9/24* (2013.01); *F16H 2001/2872* (2013.01); *F16H 2001/324* (2013.01)

(58) Field of Classification Search
CPC ........................ F16H 2001/2872; B64C 13/34
See application file for complete search history.

(56) References Cited

U.S. PATENT DOCUMENTS 3,258,995 A * 7/1966 Bennett ............. F16H 57/02004
                                                              475/342
3,633,441 A * 1/1972 Hicks .................... F16H 1/2809
                                                              475/334
(Continued)

FOREIGN PATENT DOCUMENTS

EP      0174820 A2    3/1986
EP      0329276 A2    8/1989
WO      8902041 A1    3/1989

OTHER PUBLICATIONS

Extended European Search Report for International Application No. 17275055.6 dated Nov. 2, 2017, 7 pages.

*Primary Examiner* — Tisha D Lewis
(74) *Attorney, Agent, or Firm* — Cantor Colburn LLP

(57) ABSTRACT

A rotary geared actuator, having an input gear, an output gear, a plurality of pinions) arranged in an annular configuration about a central axis (A), each pinion including an input gear element and an output gear element, the input gear element meshingly engaged with the input gear and the output gear element meshingly engaged with the output gear, a static ring gear arranged radially outwardly of the pinions and meshingly engaged with the input gear elements of the pinions, a first support ring gear arranged radially inwardly of the pinions and meshingly engaged with the input gear element, and a second support ring gear arranged radially inwardly of the pinions and meshingly engaged with the output gear element.

13 Claims, 3 Drawing Sheets

(51) Int. Cl.
  *B64C 3/38* (2006.01)
  *F16H 1/32* (2006.01)

(56) References Cited

U.S. PATENT DOCUMENTS

| | | | | |
|---|---|---|---|---|
| 4,843,912 | A | * | 7/1989 | Quick .................... F16H 1/2836 475/334 |
| 5,071,397 | A | * | 12/1991 | Grimm .................... B64C 13/34 475/263 |
| 5,106,354 | A | * | 4/1992 | Russ ........................ F16H 1/46 475/342 |
| 5,779,587 | A | * | 7/1998 | Reilly ....................... F16H 1/46 475/263 |
| 6,783,478 | B2 | * | 8/2004 | Larson ..................... F16H 1/46 475/330 |
| 2014/0224064 | A1 | | 8/2014 | Tesar |

* cited by examiner

ROTARY GEARED ACTUATOR

FOREIGN PRIORITY

This application claims priority to European Patent Application No. 17275055.6 filed Apr. 20, 2017, the entire contents of which is incorporated herein by reference.

TECHNICAL FIELD

The present disclosure relates to rotary geared actuators.

BACKGROUND

Unbalanced high-ratio rotary geared actuators, such as those used to actuate slats on an aircraft, typically utilise pinions comprising three spur gear elements. The pinions run on support rings which maintain the position of the pinions during operation. Gear reaction forces induce bending across the pinions, the bending typically inducing limiting edge loading on the outer spur gear element that engages with the actuator output gear. This loading reduces the operating life of the actuator.

It is therefore desirable to configure a stiffer pinion that intrinsically reduces bending distortion induced by gear reaction forces.

SUMMARY

According to an embodiment of the disclosure, there is provided a rotary geared actuator comprising an input gear, an output gear, a plurality of pinions arranged in an annular configuration about a central axis, each pinion including an input gear element and an output gear element, the input gear element meshingly engaged with the input gear and the output gear element meshingly engaged with the output gear, a static ring gear arranged radially outwardly of the pinions and meshingly engaged with the input gear elements of the pinions, a first support ring gear arranged radially inwardly of the pinions and meshingly engaged with the input gear element, and a second support ring gear arranged radially inwardly of the pinions and meshingly engaged with the output gear element.

The first and second support ring gears may be rotatably mounted on a carrier.

The first and second support ring gears may be rotatably received in respective grooves formed in the carrier.

The carrier may be part of or connected to the input gear so as to rotate therewith.

The first support ring gear may be arranged axially generally centrally of the input gear element.

The second support ring gear may be arranged axially generally centrally of the output gear element.

The output gear element may have a greater number of teeth than the input gear element.

The output gear element may be conventionally machined and the input gear element may be hobbed into a blind shoulder located between the input gear element and the output gear element.

In an alternate arrangement, the input gear element may have a greater number of teeth than the output gear element.

The input gear element may be conventionally machined and the output gear element may be hobbed into a blind shoulder located between the input gear element and the output gear element.

In an alternate arrangement, the rotary geared actuator may comprise an undercut between the input gear element and the output gear element.

The present disclosure also provides an aircraft comprising at least one slat on a wing of the aircraft and at least one rotary geared actuator of the present disclosure, the output gear configured to actuate a slat.

The aircraft may comprise a plurality of rotary geared actuators and a common drive shaft providing a rotary input to the actuators.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
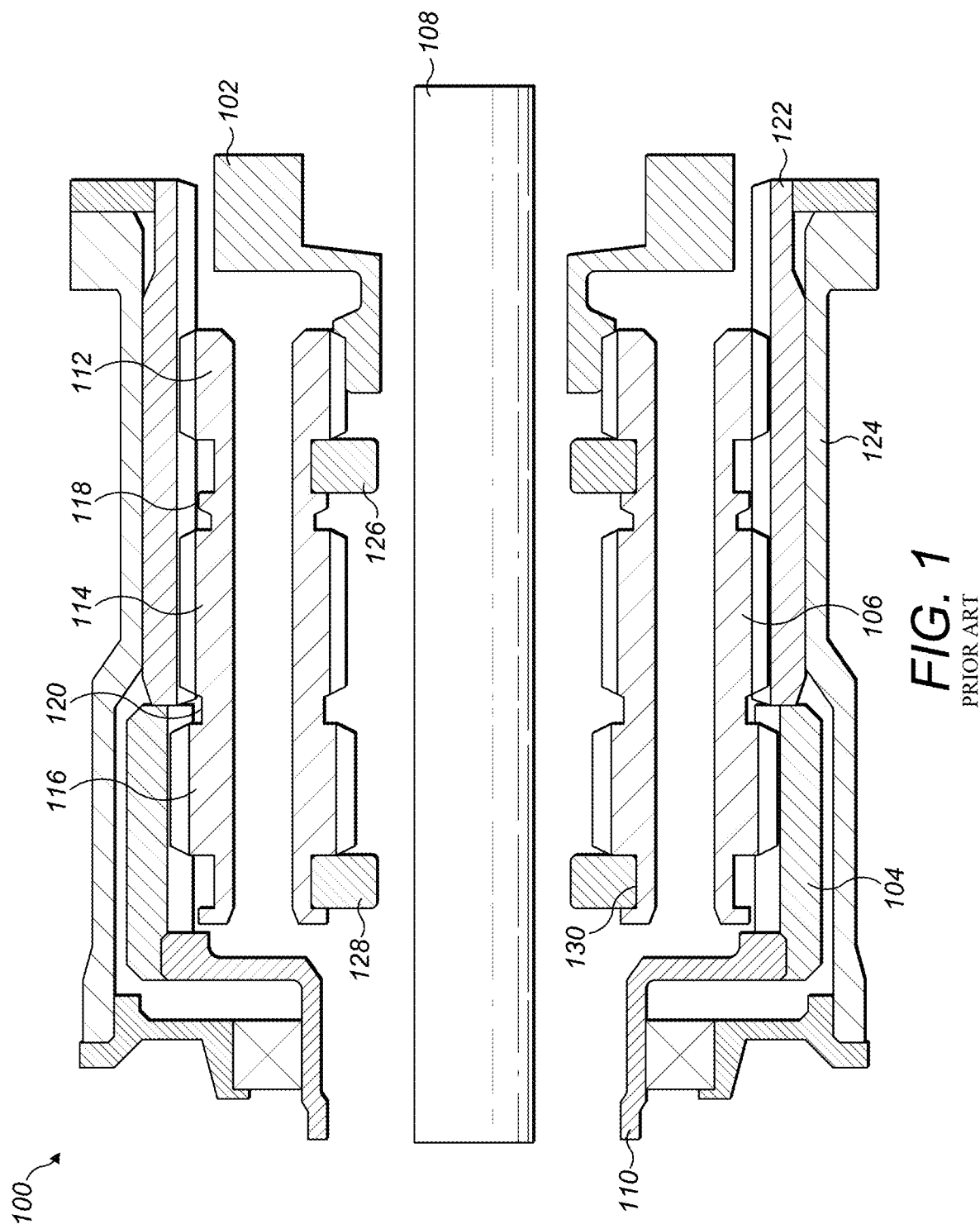
FIG. 1 shows a prior art rotary geared actuator.

FIG. 1 shows an example of a prior art rotary geared actuator 100. The actuator 100 comprises an input gear 102, an output ring gear 104, and a plurality of pinions 106 arranged in an annular configuration around a central drive shaft 108. Typically there may be five, six, seven, or even more pinions 106 in order to more evenly distribute loads in the actuator 100.

The central drive shaft 108 is coupled to the input gear 102 by suitable means, for example by means of an epicyclic gear train (not shown) with, possibly, a torque limiting device. The central drive shaft 108 typically provides a common drive to a plurality of actuators 100.

The output ring gear 104 is meshingly engaged with an annular output shaft 110 which is connected to a load, such as a slat actuation device. The actuator 100 acts to reduce the rotational speed of the central drive shaft 108 to the output shaft 110.

Each pinion 106 is meshingly engaged with the input gear 102 and the output gear 104. The pinion 106 comprises three gear elements; input gear element 112, intermediate gear element 114, and output gear element 116. The input gear element 112 and the intermediate gear element 114 are separated by a first undercut 118, and the intermediate gear element 114 and the output gear element 116 are separated by a second undercut 120. The input gear element 112 is meshingly engaged with the input gear 102, and the output gear element 116 is meshingly engaged with the output gear 104. The intermediate gear element 114 has the same number of teeth as the input gear element 112, but the output gear element 116 has a different number of teeth than the input gear element 112.

The pinions 106 meshingly engage with an earth ring gear 122 which surrounds the pinions 106. This ring gear 122 is static and may be suitably mounted on actuator housing 124. The pinions 106 also rotationally engage two support rings 126, 128 which surround the central drive shaft 108. The pinions 106 are able to rotate relative to the support rings 126, 128 about their own rotational axes.

A first support ring 126 is positioned in the first undercut 118 between the input gear element 112 and the intermediate gear element 114. A second support ring 128 is shown positioned in a groove 130 arranged at one end of the pinion 106 adjacent the output gear element 116. In other arrangements, the second support ring 128 may be arranged in the second undercut 120 between the intermediate gear element 114 and the output gear element 116. The first and second support rings 126, 128 maintain the position of the pinions 106 during operation, preventing the pinions 106 from moving radially inwardly towards the central drive shaft 108. The support rings 126, 128 are maintained in their axial positions by virtue of their engagement in the undercuts 118, 120 and grooves 130.

During operation, gear reaction forces induce bending across the individual pinions 106. Bending may occur between the intermediate gear element 114 and the output gear element 116, causing an uneven distribution of load across the pinion 106. This may reduce the lifespan of the actuator 100.

Figure 2:
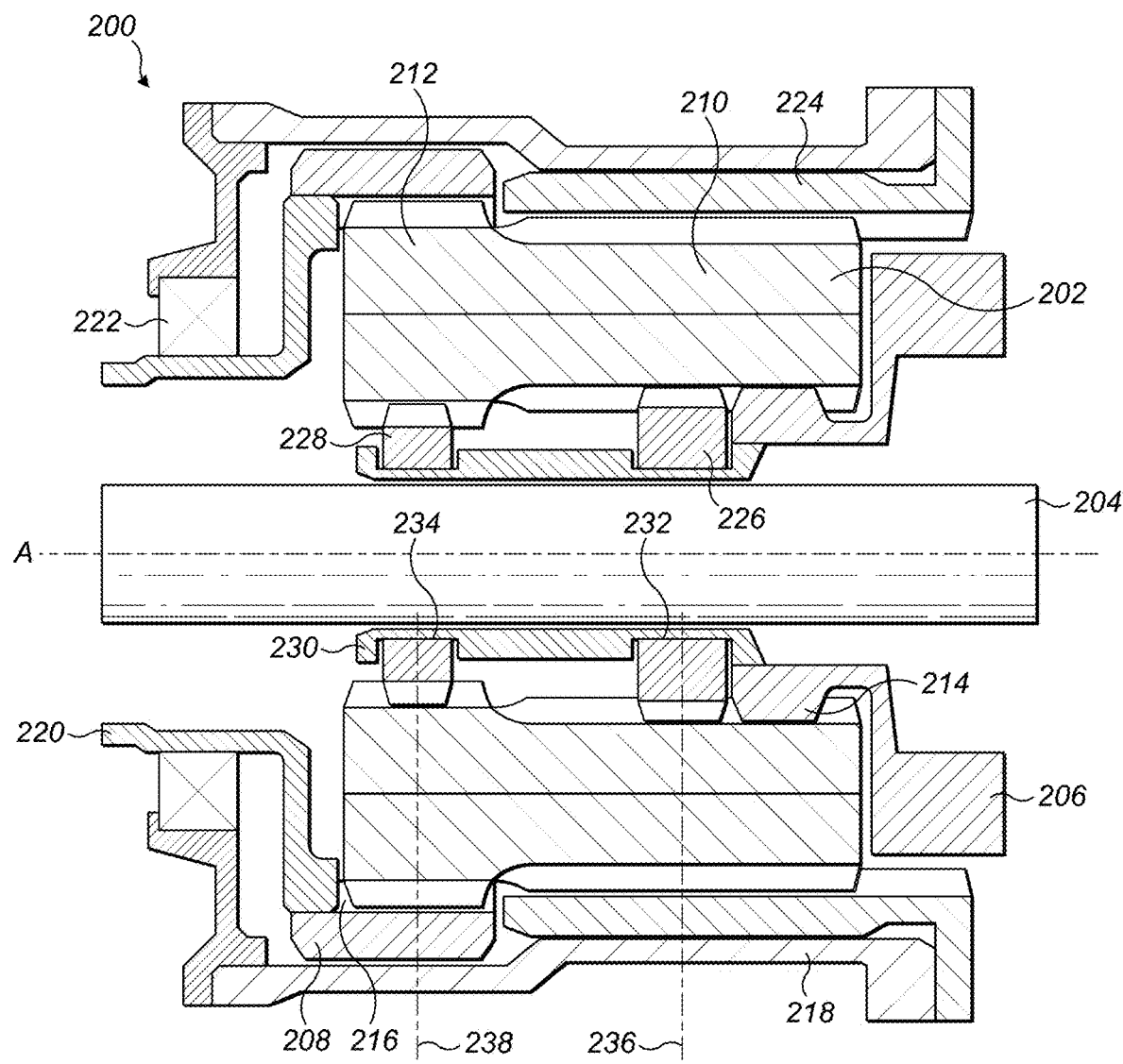
FIG. 2 shows a rotary geared actuator according to an embodiment.

FIG. 2 shows a rotary geared actuator 200 according to an embodiment of the present disclosure.

Figure 3:
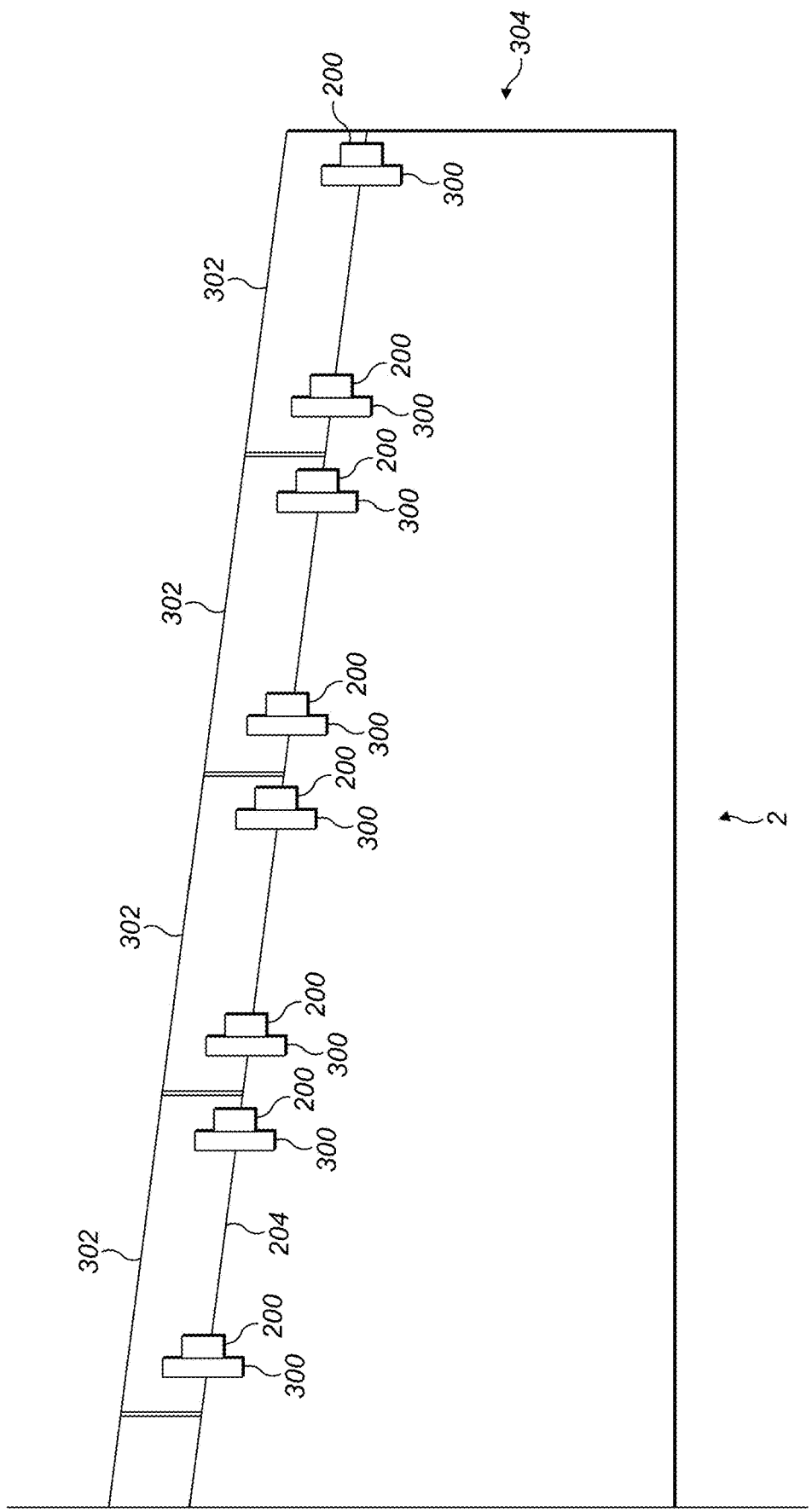
FIG. 3 illustrates, schematically, an aircraft wing incorporating a plurality of rotary geared actuators.

The general layout of the actuator 200 is similar to that of the prior art arrangement above, with plurality of pinions 202 arranged in an annular configuration about a central drive shaft 204. Typically there may be five, six, seven, or even more pinions 202 in order to provide the torque capacity in the actuator 200. The pinions 202 extend in an axial direction A between an input gear 206 and an annular output gear 208. The central drive shaft 204 is coupled to the input gear 206 by suitable means, for example by means of an epicyclic gear train (not shown) with, possibly, a torque limiting device. The central drive shaft 204 typically provides a common drive to a plurality of actuators 200. As illustrated in FIG. 3, the actuators 200 may drive slat actuators 300 for extending and retracting slats 302 arranged on the leading edge of an aircraft wing 304.

Each pinion 202 comprises two gear elements; an input gear element 210 and an output gear element 212. In this embodiment, the output gear element 212 has a larger outer diameter than the input gear element 210. The gear elements 210, 212 are spur gears in this embodiment.

The output gear element 212 has a different number of teeth than the input gear element 210. The output gear element 212 may have a greater number of teeth than the input gear element 210, or the input gear element 210 may have a greater number teeth than the output gear element 212.

The input gear element 210 is meshingly engaged with teeth 214 of the input gear 206, and the output gear element 212 is meshingly engaged with teeth 216 of the annular output gear 208. The output gear 208 is rotatable within actuator housing 218 and is meshingly engaged with an annular output shaft 220 which is connected to a load, such as a slat actuation device. The annular output shaft 220 is rotationally supported on the actuator housing 218 by means of a bearing 222.

As in the earlier arrangement, the actuator 200 acts to reduce the rotational speed of the central drive shaft 204 to the output shaft 220.

An annular earth ring gear 224 is fixedly mounted in the actuator housing 218 and meshes with the input gear element 210 substantially along the entire length of the input gear element 210.

In this embodiment, the support rings 126, 128 of actuator 100 are replaced with first and second support ring gears 226, 228 arranged radially inwardly of the pinions 202. The first support ring gear 226 is meshingly engaged with the input gear element 210, and the second support ring gear 228 is meshingly engaged with the output gear element 212 such that as the pinions rotate, the support ring gears 226, 228 will also rotate. The support ring gears 226, 228 are slave gears with no output, and serve only to locate the pinions 202 by conventional gear meshing.

In this embodiment, the support gear rings 226, 228 are located axially in a carrier 230. The carrier 230 comprises first and second grooves 232, 234 which rotationally receive the support gear rings 226, 228. In this embodiment, the carrier 230 is a part of, or connected to, the input gear 206 so as to rotate therewith. The support ring gears 226, 228 can, however, rotate relative to the carrier 230. In other embodiments the carrier may be supported on the central drive shaft 204, for example.

The first support ring gear 226 may be arranged axially generally centrally of the input gear element 210. Thus the first support ring gear 226 and the input gear element 210 may have substantially aligned centrelines 236. Similarly the second support ring gear 228 may be arranged axially generally centrally of the output gear element 212. Thus the second support ring gear 228 and the output gear element 212 may have substantially aligned centrelines 238.

It will be seen in this embodiment, therefore that by replacing the support rings of the prior art by support ring gears which mesh on the input and output gear elements, the undercuts previously provided for receiving the support rings may be eliminated. This provides a higher stiffness pinion. It also means that the axial length of the pinion may be reduced compared to the prior design, also improving the stiffness.

The first and second support ring gears 226, 228 reduce bending across the pinion 202 by evenly distributing the load across the pinion 202. The removal of the first and second support rings 126, 128 also reduces the total length of the pinion 202, which increases the stiffness of the pinion, and removes the need for an undercut 118 separating a single input gear element 210 into separate input and intermediate gear elements 112, 114, further increasing pinion stiffness.

Pinion gear tooth cutting may be facilitated by providing a conventional undercut between the input gear element 210 and the output gear element 212, or, as shown in FIG. 2, by hobbing each gear element to a given axial position, thus enabling a traditional undercut to be eliminated. This increases the stiffness of the overall pinion 202 by eliminating a minimum section as governed by a traditional undercut feature and shortening of the overall pinion length.

Although the figures and the accompanying description describe particular embodiments and examples, it is to be understood that the scope of this disclosure is not to be limited to such specific embodiments, and is, instead, to be determined by the following claims.

The invention claimed is:
1. A rotary geared actuator, comprising:
an input gear;
an output gear;
a plurality of pinions arranged in an annular configuration about a central axis (A), each pinion including an input gear element and an output gear element, the input gear element meshingly engaged with the input gear and the output gear element meshingly engaged with the output gear;
an earth ring gear arranged radially outwardly of the pinions and meshingly engaged with the input gear elements of the pinions;
a first support ring gear arranged radially inwardly of the pinions and meshingly engaged with the input gear element; and a second support ring gear arranged radially inwardly of the pinions and meshingly engaged with the output gear element.

2. The rotary geared actuator of claim 1, wherein the first and second support ring gears are rotatably mounted on a carrier.

3. The rotary geared actuator of claim 2, wherein the first and second support ring gears are rotatably received in respective grooves formed in the carrier.

4. The rotary geared actuator of claim 2, wherein the carrier is part of or connected to the input gear so as to rotate therewith.

5. The rotary geared actuator of claim 1, wherein the first support ring gear is arranged axially generally centrally of the input gear element.

6. The rotary geared actuator of claim 5, wherein the second support ring gear is arranged axially generally centrally of the output gear element.

7. The rotary geared actuator of claim 1, wherein the output gear element has a greater number of teeth than the input gear element.

8. The rotary geared actuator of claim 7, wherein the output gear element is conventionally machined and the input gear element is hobbed into a blind shoulder located between the input gear element and the output gear element.

9. The rotary geared actuator of claim 1, wherein the input gear element has a greater number of teeth than the output gear element.

10. The rotary geared actuator of claim 9, wherein the input gear element is conventionally machined and the output gear element is hobbed into a blind shoulder located between the input gear element and the output gear element.

11. The rotary geared actuator of claim 1, further comprising an undercut between the input gear element and the output gear element.

12. An aircraft, comprising:
at least one slat on a wing of the aircraft; and
at least one rotary geared actuator that includes:
an input gear;
an output gear configured to actuate a slat;
a plurality of pinions arranged in an annular configuration about a central axis (A), each pinion including an input gear element and an output gear element, the input gear element meshingly engaged with the input gear and the output gear element meshingly engaged with the output gear;
an earth ring gear arranged radially outwardly of the pinions and meshingly engaged with the input gear elements of the pinions;
a first support ring gear arranged radially inwardly of the pinions and meshingly engaged with the input gear element; and
a second support ring gear arranged radially inwardly of the pinions and meshingly engaged with the output gear element.

13. The aircraft of claim 12, comprising a plurality of rotary geared actuators, and a common drive shaft providing a rotary input to the actuators.

* * * * *